United States Patent

Everett

[11] Patent Number: 6,151,766
[45] Date of Patent: Nov. 28, 2000

[54] METHOD FOR PRE-SETTING A SELF-ADJUSTING FRICTION TORQUE DEVICE

[75] Inventor: Kenneth H. Everett, Northamptown, Pa.

[73] Assignee: Mack Trucks, Inc., Allentown, Pa.

[21] Appl. No.: 09/131,665

[22] Filed: Aug. 10, 1998

[51] Int. Cl.$^7$ .................................................. B23Q 17/00
[52] U.S. Cl. .................................. 29/407.05; 29/407.09; 192/110 R; 33/606
[58] Field of Search ............................ 29/407.01, 407.05, 29/407.09; 33/606; 192/70.25, 110 R, 111 A

[56] References Cited

U.S. PATENT DOCUMENTS

| | | |
|---|---|---|
| 971,375 | 9/1910 | Hays . |
| 1,868,675 | 7/1932 | Spase . |
| 1,984,231 | 12/1934 | Parker et al. . |
| 2,311,042 | 2/1943 | Ferguson . |
| 2,756,789 | 7/1956 | Kraus et al. . |
| 4,332,314 | 6/1982 | Flotow . |
| 4,660,702 | 4/1987 | Flotow . |
| 5,174,008 | 12/1992 | Adler et al. ......................... 29/407.05 |
| 5,181,593 | 1/1993 | Flotow et al. . |
| 5,238,093 | 8/1993 | Campbell . |
| 5,531,308 | 7/1996 | Gochenour et al. . |
| 5,562,193 | 10/1996 | Yamaguchi . |
| 5,564,541 | 10/1996 | Gochenour et al. . |
| 5,564,542 | 10/1996 | Gochenour et al. . |
| 5,566,804 | 10/1996 | Gochenour et al. . |
| 5,595,274 | 1/1997 | Gochenour et al. . |
| 5,595,275 | 1/1997 | Gochenour et al. . |

*Primary Examiner*—David P. Bryant
*Attorney, Agent, or Firm*—Rothwell, Figg, Ernst & Manbeck, P.C.

[57] ABSTRACT

A method and apparatus for pre-adjusting, prior to engagement of an engine and a transmission, a self-adjusting clutch such as a self-adjusting clutch manufactured by Dana Corporation's Spicer Clutch Division of Auburn, Indiana, known as the Spicer Solo, Adjustment-Free Clutch. The method includes the steps of: a) releasing the clutch pressure to allow the indicator wear tab of the clutch to move; b) positioning an adjustable contact element against the indicator wear tab to limit the movement of the indicator wear tab so as to specifically locate the position of the wear tab and, hence, the position of the release bearing; c) reapplying the clutch pressure; d) taking a reading of the position of the release bearing. Steps a) through d) can be repeated as needed. The adjustable contact element is preferably mounted on a generally U-shape frame having means to attach the frame proximate the clutch and means to adjust the position of the contact element. The present invention enables much smaller pre-set tolerances of the position of the release bearing—e.g., much smaller than 0.100 inches and even as low as about 0.23 inches in certain embodiments. As a result, clutch life, operability and maintenance can be greatly improved.

9 Claims, 4 Drawing Sheets

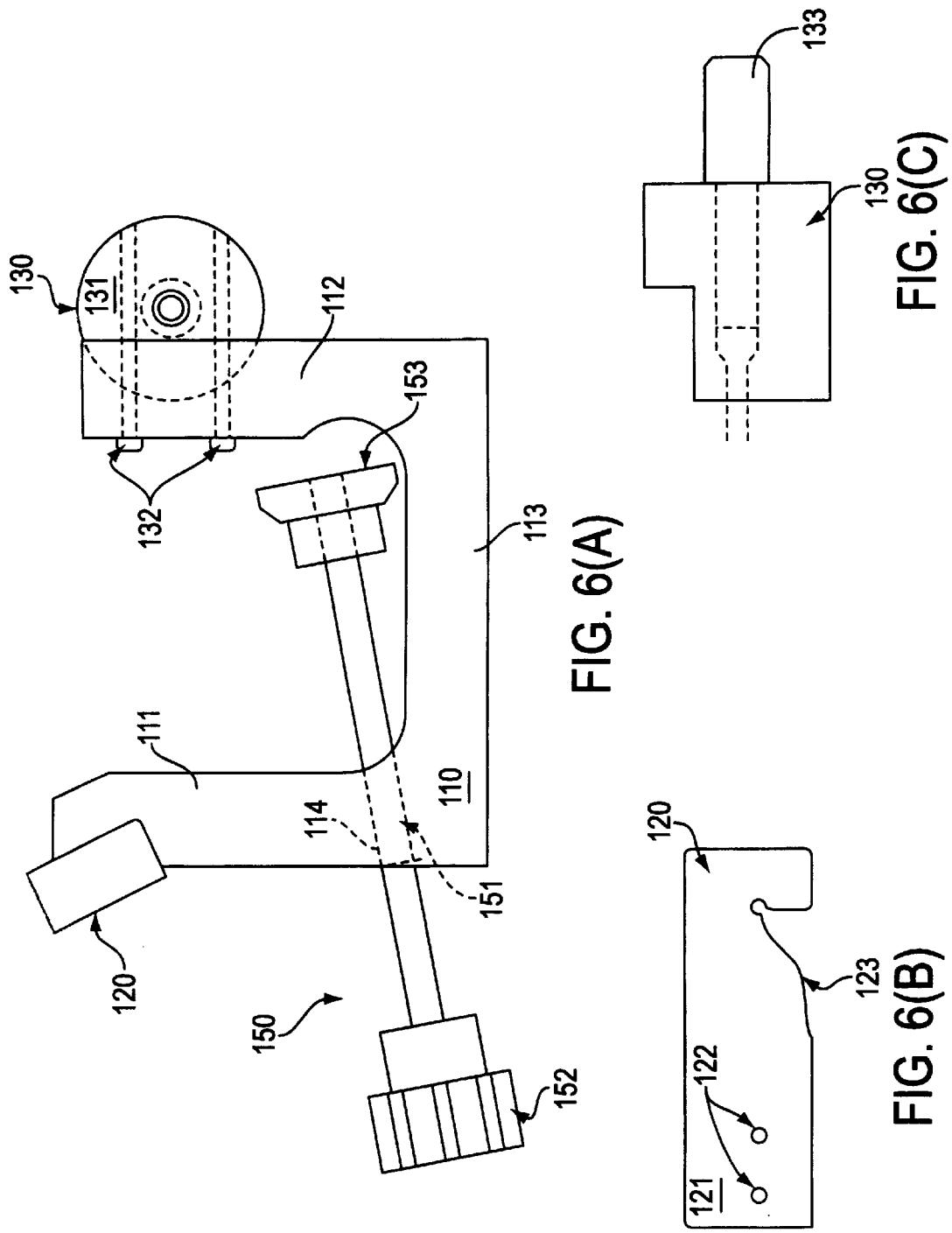

METHOD FOR PRE-SETTING A SELF-ADJUSTING FRICTION TORQUE DEVICE

BACKGROUND OF THE INVENTION

1. Field of the Invention

The present invention relates to the adjustment of friction torque devices such as clutches for motors of vehicles and the like. The present invention provides, among other things, a novel method and apparatus for pre-setting a self-adjusting clutch and, in particular, for pre-setting a self-adjusting clutch manufactured by Dana Corporation's Spicer Clutch Division of Auburn, Indiana known as the Spicer Solo, Adjustment-Free Clutch (the "Spicer Clutch").

2. Background of the Invention

Self-adjusting clutches like the Spicer Clutch allow clutches to be operated throughout their life without "manual clutch adjustments" that common clutches require. Otherwise, for example, thirteen or more manual clutch adjustments may be needed. A greater clutch life is also available with such self-adjusting clutches.

Self-adjusting clutches like the Spicer Clutch could not previously be set to sufficiently small tolerances for a number of applications. Specifically, manufacturers and service departments could only set the release bearing to within about 0.100 of an inch. This degree of inaccuracy, i.e., tolerance, for the initial setting of such self-adjusting clutches has proven to be problematic and disadvantageous. For example, a smaller tolerance of about 0.06 inches is needed for trucks by Mack Trucks, Inc.

This inability to provide sufficiently small tolerances has created an industry-wide problem. It has also added costs to trucks, delayed deliveries, and frustrated both internal and external customers. This inability to pre-set the initial setting within a sufficient tolerance range has substantially compromised the benefits, life-expectancy, and operation of such self-adjusting clutches.

Among other things, a variation in the clutch position creates a corresponding variation in the pedal position in the vehicle. Typically, with vehicles of Mack Trucks, Inc. for example, the ratio of clutch/pedal movement is about (0.010 inches at the clutch)/(0.136 inches at the pedal). A tolerance range of 0.100 thus allows a variation of about 1.36 inches at the vehicle pedal. As a result, a variety of problems can occur. For example, proper operation of a clutch brake can be disturbed which can result in damage or wear, the vehicle operator's normal clutch operation can be disturbed (e.g., removing typical play in the pedal), and other problems can occur.

There is thus a substantial need in the art for a method and/or apparatus that can improve the pre-setting accuracy of self-adjusting clutches such as a Spicer Clutch.

FIGS. 1–3 illustrate an exemplary self-adjusting Spicer Clutch in an assembled condition on a vehicle—i.e., after the engine and the transmission have been connected. These FIGS. are included as a brief explanatory background and are incorporated from U.S. Pat. No. 5,595,274. The entire disclosure of the '274 patent is, however, incorporated herein by reference.

FIG. 1 shows a clutch 20 that selectively transmits torque from an engine flywheel 22 to a driven shaft 24 of a vehicle transmission 26. A standard clutch release assembly 28, operated via a pedal 30, is used for disengaging the clutch from the flywheel 22. The flywheel 22 is fixed to a cover 32 and rotates therewith. A pressure plate 34 and a driven member 36 that is fixed to the driven shaft 24 are sandwiched between the flywheel 22 and the cover 32. The pressure plate 34 is selectively moved to the left to transmit torque from the flywheel 22 to the driven shaft 24 via the friction pads 38.

When the friction pads wear, an adjustment mechanism 42 automatically adjusts the clutch to compensate for this wear. The adjustment mechanism 42 includes an adjusting ring 44, a left cam ring 46 secured to adjusting ring 44, and a right cam ring 48.

Coil springs 56 interposed between the cover 32 and a retainer 54 urge the retainer 54 to the left. A plurality of levers 58 are radially interposed between the retainer 54 and the adjustment mechanism 42. As a result, leftward movement of the retainer assembly 28 causes the levers 58 to apply a leftward force on the pressure plate to engage the clutch members.

The left cam ring 46 is fixedly secured to the adjusting ring 44 which is rotatably fixed to the cover 32 but which is permitted limited axial movement. In contrast, the right cam ring 48 is permitted limited rotational movement with respect to the cover 32. The right face of the left cam ring 46 includes a plurality of annular ramps 80 around the perimeter thereof. Similarly, the left face of the right cam ring 48 has a plurality of like annular ramps, while the right face of the right cam ring 48 contacts the cover 32. The ramps of the right cam ring 48 cam against the ramps 80 of left cam ring 46. The surfaces of the ramps also include serrations, or teeth, which assist in locking the contacting surfaces together and which increase the frictional resistance between the cam rings.

An indicator tab 106 extends from the right cam ring 48 through a circumferential slot 108 in the cover 32. The indicator tab 106 indicates the amount that right cam ring 48 has rotated with respect to the cover 32 and, thus, the amount of adjustment which has occurred within the clutch 20.

A spring assembly (not shown) biases the right cam ring 48 to rotate with respect to cover 32. When under tension, the spring assembly biases the right cam ring to rotate with respect to the left cam ring under conditions required for adjustment. As the right cam ring 48 rotates clockwise, the ramps cam against each other, moving the adjusting ring 44 from a first axial position to a second axial position, increasing the axial displacement of the left cam ring and the right cam ring.

When the clutch 20 is fully disengaged, the pull assembly 52 of the release assembly 28 contacts the transmission housing 55, which is the extreme right position for release assembly 28, as shown in FIG. 3. The radially outer portion of the lever 58 leverages the adjusting ring away from the cover 32 and creates a gap between the left and right cam rings. The biasing forces on the right cam ring 48 caused by the spring assembly rotate the right cam ring 48. This, in turn, results in camming along ramps 80 and 88 to increase the axial displacement of adjustment mechanism 42 to fill the gap. This action repeats each time wear has occurred on friction surface 40 and when the clutch 20 is fully disengaged. The mechanism 42 stops adjusting when the clutch is fully worn. At which time, the tab 106 contacts an end of slot 108 to prevent further rotation of the right cam ring 48.

As set forth above, the Spicer Clutch has previously only been able to be pre-set within a tolerance range of 0.100 inches. This range, however, is insufficient and there is a substantial need in the art for a method and/or apparatus that can improve the pre-setting accuracy of such self-adjusting clutches.

SUMMARY OF THE INVENTION

The present invention overcomes the above-noted and many other problems in the existing art.

A first aspect of the invention involves a method of pre-adjusting a self-adjusting clutch having a plurality of cam rings and an indicator wear tab on one of the cam rings, having the steps of: a) releasing the clutch pressure to allow the indicator wear tab to move; b) positioning an adjustable contact element against the indicator wear tab to limit the movement of the indicator wear tab so as to specifically locate the position of the wear tab and, hence, the position of the release bearing; c) reapplying the clutch pressure; d) taking a reading of the position of the release bearing. Notably, steps a) through d) can be carried out prior to connecting the engine to the transmission.

According to another aspect of the invention, an adjustment device for pre-adjusting a self-adjusting clutch that has a plurality of cam rings and an indicator wear tab on one of the cam rings prior to connecting an engine to a transmission is provided which includes: a) a contact element for contacting the indicator wear tab; b) attaching means for attaching the adjustment device proximate the clutch; and c) adjusting means for adjusting the position of the contact element; whereby the contact element can be selectively positioned against the indicator wear tab to limit the movement of the wear tab to specifically locate the position of the wear tab and hence to preset the position of the release bearing prior to connecting the engine and the transmission.

Preferably, the device includes a frame and the attaching means includes first and second connecting members that connect the frame proximate the clutch.

The above and many other aspects, features and advantages of the present invention are further presented in the detailed description of the preferred embodiments of the invention which follows.

BRIEF DESCRIPTION OF THE DRAWINGS

FIG. 6(A) is a side view of an adjustment mechanism according to a most preferred embodiment of the invention;

FIG. 6(B) is a side view of a first connecting member for mounting the adjustment mechanism shown in FIG. 6(A) according to the most preferred embodiment of the invention; and FIG. 6(C) is a side view of a second connecting member for mounting the adjustment mechanism shown in FIG. 6(A) according to the most preferred embodiment of the invention.

DETAILED DESCRIPTION OF THE INVENTION

The present invention provides a novel method and apparatus for pre-setting a self-adjusting torque friction device or clutch. As noted, the present method and apparatus is particularly advantageous in the pre-setting of a self-adjusting clutch manufactured by Dana Corporation's Spicer Clutch Division of Auburn, Indiana known as the Spicer Solo, Adjustment-Free Clutch (the "Spicer Clutch").

According to a first aspect of the invention, a preferred method for setting a self-adjusting clutch on an engine and, more specifically, for setting a self-adjusting Spicer Clutch on an engine includes the following steps which are conducted prior to connecting the engine and the transmission:

1) releasing the clutch pressure to allow the indicator wear tab to move;
2) positioning an adjustable contact element against the indicator wear tab to limit the movement of the wear tab so as to specifically locate the position of the wear tab;
3) reapplying the clutch pressure;
4) taking a reading at the release bearing to determine the accuracy of its position;
5) if the reading in step 4 is outside of a desired range, repeating steps 1–4 with the adjustable contact element at new positions, until a proper tolerance is achieved.

In order to perform the above-noted method, a novel adjustment device is employed which includes an adjustable contact element that is positioned against the indicator wear tab to limit the movement of the wear tab. The adjustment device includes means for attachment proximate to the side of the clutch (on, for example, the side of the cover 32), a contact element to contact the indicator wear tab, and a means for adjusting the position of the contact element. The means for attachment proximate the side of the clutch can include a variety of known attachment devices, such as for example bolts, pins, screws, clamps, or any other known attachment means. In addition, the means for adjusting the position of the contact element can include any known moving means, such as a rack and pinion moving means, a threaded shaft moving means, a motor driven moving means (such as, for example, a linear output stepper motor), an electronic moving means, a hydraulic or a pneumatic moving means or any other known moving means. The moving means can be automatically controlled, but it is preferably manually controlled. Most preferably, the moving means enables a continuous adjustment or small incremental adjustments of the position of the contact element.

Figure 5:
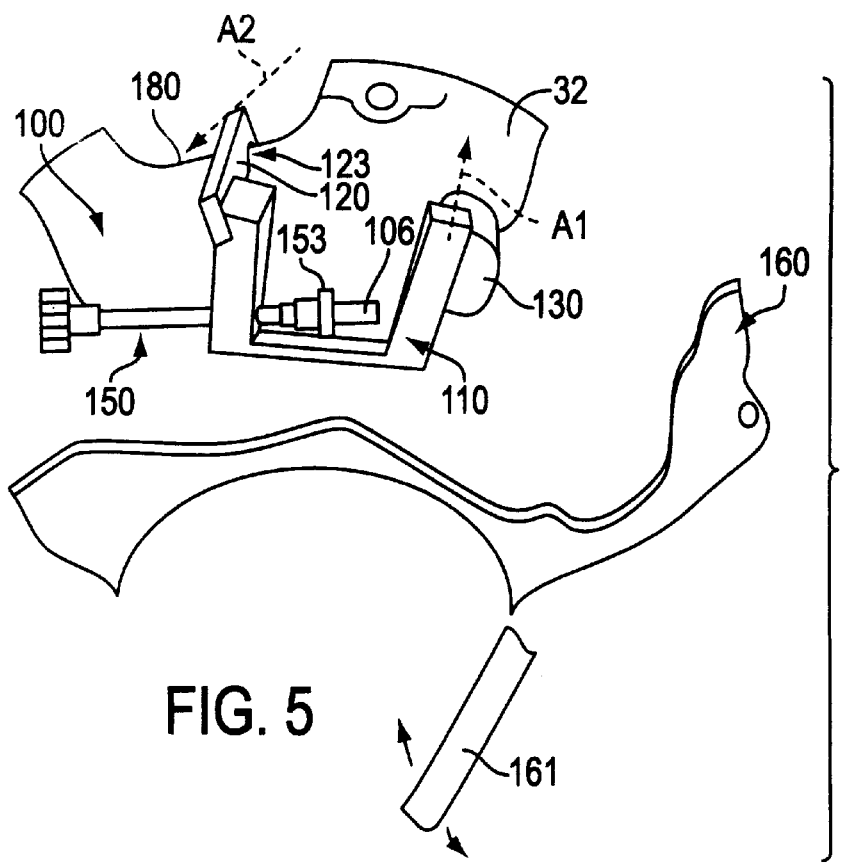
FIG. 5 is a schematic side view showing the preferred mounting of a preferred adjustment mechanism according to a preferred embodiment of the invention.

A most preferred embodiment of the adjustment device 100 is shown in FIGS. 5 and 6. As shown, the adjustment device 100 preferably includes a generally U-shaped frame 110 having left and right legs 111 and 112, respectively, and a base 113. The means for attaching the frame 110 to the side of the clutch preferably includes a first connecting member 120 attached to the left leg 111 and a second connecting member 130 attached to the right leg 112. Although the frame is preferably generally U-shaped as shown, the frame 110 can be formed with a variety of configurations as long as it can support an adjustable contact element. Similarly, although the first and second connecting members 120 and 130, respectively, are the preferred means for attachment, the frame 110 can be attached via any known means as discussed above.

The first connecting member 120 preferably includes an arm 121 extending transverse (e.g., generally perpendicular) to the axis of the first lea 111. The arm 121 can include screw holes 122 to mount the arm on the leg 111 with screws or the like, or it can be attached thereto in any known manner, or it can even be integrally formed therewith. The distal end of the arm 121 preferably includes a generally V-shaped notch 123 to serve as a holding stop that hooks onto a portion of the clutch cover. The shape of the notch 123 is specifically designed to fit snugly against the clutch cover.

The second connecting member 130 preferably includes a base 131 mounted to the end of the leg 112 via screws 132 as shown in FIG. 6(A). The base 131 can also be mounted thereto in any known manner or it can even be integrally formed therewith. A locating pin 133 is mounted on the base 131 and extends from the frame 110 in generally the same direction as the arm 121.

The frame 110 is provided as a support for an adjustor 150 having an adjustable contact element 153. In the preferred embodiment, as shown, the adjustor 150 includes a threaded shaft 151 that is received within an internally threaded bore 114 through the frame 110. The adjustor 150 preferably includes a manually operated knob 152 on an outer end of the shaft 151 and a contact element 153 on an inner end of the shaft 151. The periphery of the knob 152 preferably has ridges to facilitate manual rotation.

The adjustment device 100 can be made with a variety of materials such as metals, composites, ceramics, plastics, natural materials such as wood, and/or any other suitable materials. In one preferred construction, the frame 110, the connecting members 120 and 130, and the adjustor 150 are made with Nylatron, while the shaft 151 and the locating pin 133 are made with carbon rolled steel.

The various sizes of the parts of the adjustment device 100 can vary greatly depending on the particular circumstances at hand. One exemplary construction includes sizes, in inches, as shown on FIGS. 6(A)–6(C). The reference numerals on FIGS. 6(A)–6(C) which are not used herein to identify particular parts are used to identify sizes in inches of this exemplary embodiment.

Figure 1:
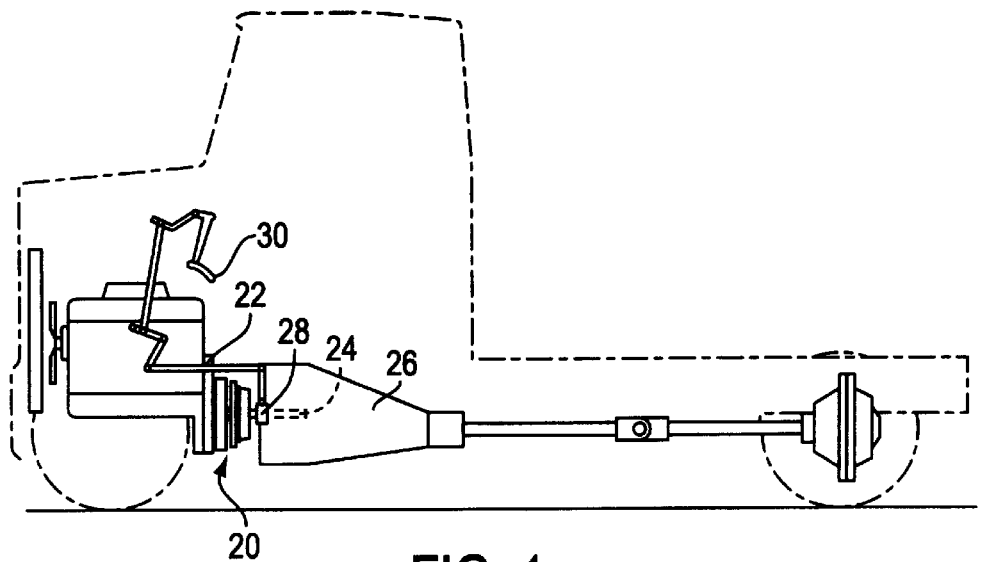
FIG. 1 illustrates an automatically adjusting clutch mounted in a vehicle according to the prior art.
Figure 2:
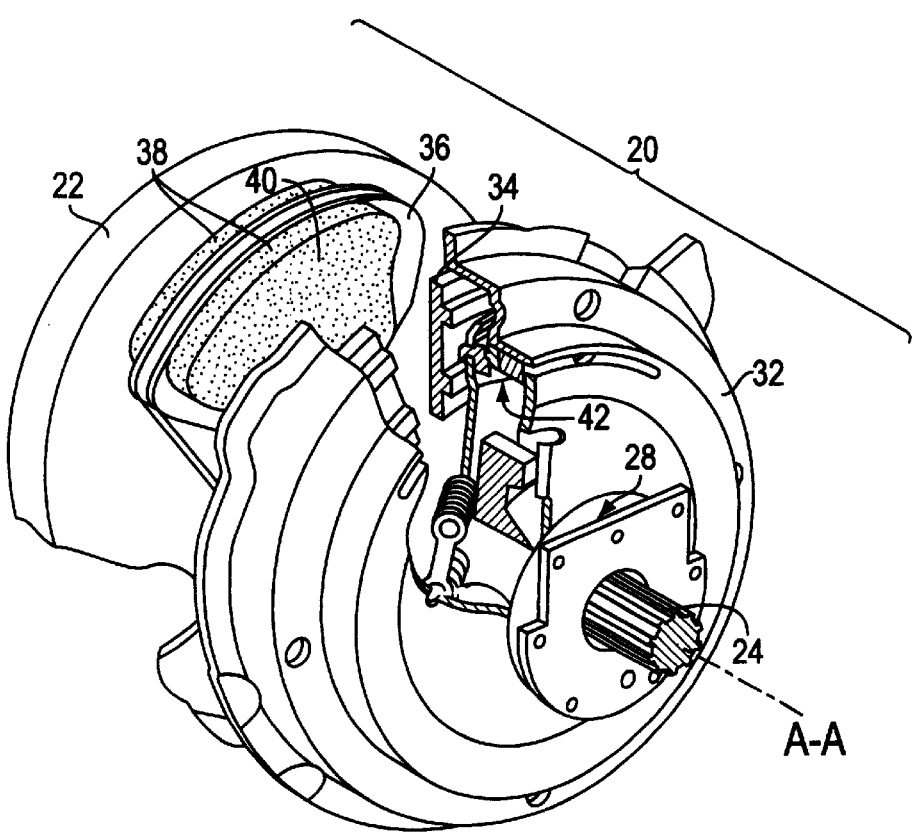
FIG. 2 is a perspective view of the automatically adjusting clutch shown in FIG. 1.
Figure 3:
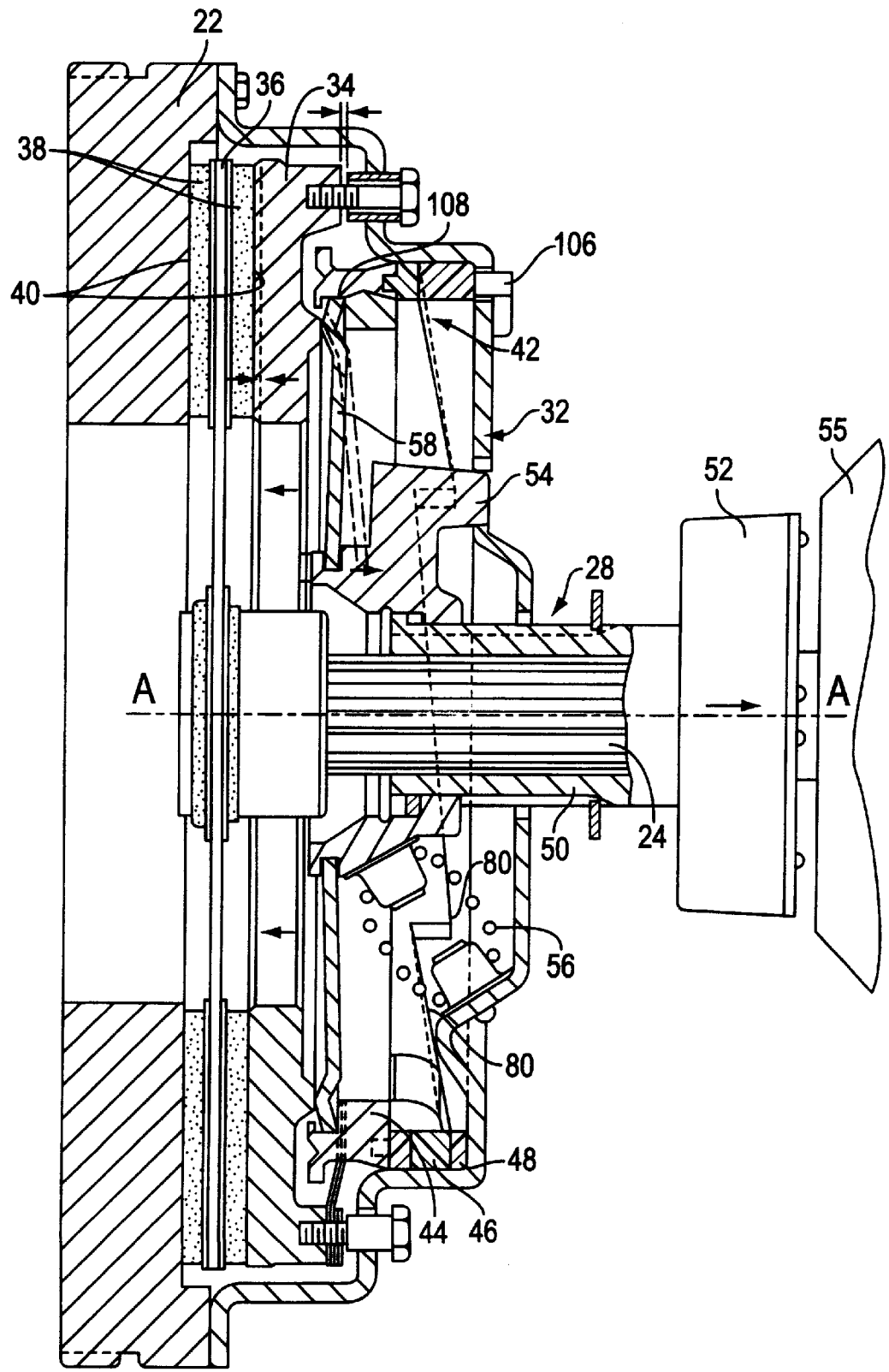
FIG. 3 is a cross-sectional view of the automatically adjusting clutch shown in FIG. 1.

A preferred method of pre-setting a clutch, such as a Spicer Clutch shown in FIGS. 1–3, with the adjustment device 100 is as follows.

First, prior to engagement of the engine to the transmission, the clutch pressure is released to allow the second cam ring 48 and the indicator wear tab to move. The release of the clutch pressure can be achieved in a variety of ways; those in the art would recognize a variety of ways to release the clutch pressure. For example, a jig assembly 160, FIG. 5, having a manually movable arm 161 capable of being positioned to move the release bearing can be temporarily attached to the engine housing. The arm 161 can then be used in a known manner to move the release bearing to disengage and/or to engage the clutch.

Figure 4:
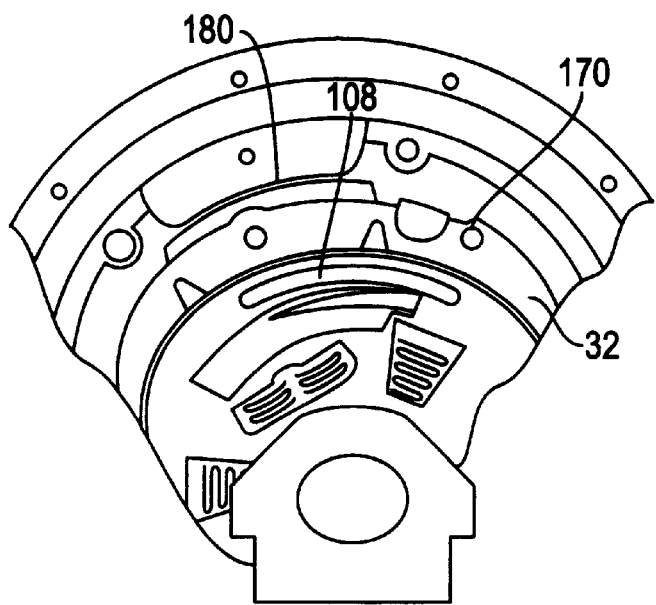
FIG. 4 is a partial side view of a self-adjusting clutch, such as a Spicer Clutch, illustrating a preferred location for mounting an adjustment mechanism according to a preferred embodiment of the invention.

Second, the adjustment device 100 is mounted proximate the clutch face. In this regard, the locating pin 133 can be inserted into a pre-machined hole 170, FIG. 4, in the clutch cover 32 in the direction of the arrow A1, FIG. 5. Then, the adjustment device can be pivoted counter-clockwise in the direction of the arrow A2, FIG. 5, until the notch 123 stops against and snugly fits onto a ridge 180 of the clutch cover. In this position, the adjustor 150 can be aligned with the indicator wear tab 106 as shown in FIG. 5.

Third, the contact element 153 is then positioned at a desired location to specify the position of the wear tab by limiting rotation of the wear tab. In this regard, when the clutch pressure is released, the indicator wear tab 106 is biased counter-clockwise in FIG. 5 via its spring assembly so that the wear tab will abut the contact element 153.

Fourth, then the clutch pressure is reapplied. As discussed, the engagement and/or disengagement of the clutch can be conducted in any known manner, such as via a handle 161 as shown in FIG. 5.

Fifth, with the clutch pressure reapplied, the position of the release bearing can be measured. This position can be measured using any known means. As just one example, the release bearing position can be measured using a device similar to element 26 shown in U.S. Pat. No. 5,562,193, the entire disclosure of which is incorporated herein by reference. A variety of devices, however, for measuring the position of the release bearing can be used as are known in the art.

Sixth, if the reading in step five is outside of a desired tolerance, steps one through five can be repeated with the adjustable contact element being repositioned until a proper tolerance is achieved. It should be understood that the adjustment mechanism 100 can remain on the clutch cover until the final pre-setting is made.

Thereafter, the engine and the transmission can be connected and the clutch can thus be pre-set within a small range of error, i.e. within a small tolerance level. The present invention thus enables the operator to pre-set the self-adjusting clutch to an exact dimension at a fraction of the tolerance provided by the manufacturer of the clutch. The present invention enables the first and second cam rings to be pre-set together so as to lock in a particular relationship to one another.

The present invention enables the Spicer Clutch to be pre-set within a very small tolerance corresponding, for example, to the size of a single serration or tooth on the first and second cams. Accordingly, the present invention enables a person to set the release bearing position to within about 0.023 inches (i.e., corresponding to the closest tooth setting) in such a Spicer Clutch. Thus, the present invention enables the clutch to be pre-set within a range well below the 0.100 inch tolerance previously available, and even well below the 0.06 inch tolerance required for trucks of Mack Truck, Inc., and even well below 0.04 inches. In one example where the distance between the pull assembly or release bearing 52 and the transmission 55, FIG. 3, was typically between about 0.490–0.590 inches (i.e., a tolerance of 0.100 inch), the present invention can maintain a more optimal distance (e.g., closer to about 0.520 inches) by remaining within a smaller tolerance range, such as for example between about 0.495–0.535 inches.

The preferred embodiments of the present invention can also preferably be used by a single operator to quickly and easily pre-set such a clutch.

Because the initial setting was not previously capable of being set within the limited range afforded by the present method and apparatus, a variety of problems previously occurred. As some examples, clutch brakes were subject to wear and damage, clutch pedal operation for the vehicle operator was compromised, and clutch life was compromised. An industry-wide problem was created by this inability to set sufficiently small tolerances. Prior methods also added costs to the trucks, delayed delivery and frustrated both the internal and the external customers.

On the other hand, the present invention greatly reduces required maintenance, and increases clutch life, and enhances user operability of the clutch. The present apparatus and method can be utilized with any adjustment-free clutches having an indicator wear tab on such an annular cam ring or the like structure. Currently, Dana Corp.'s Spicer Clutch Division markets appropriate clutches for both medium-duty and heavy-duty trucks.

While the preferred embodiments of the invention have been described herein-above, it should be understood that various modifications to the preferred embodiments can be made based on this disclosure and the knowledge of those in the art. All such modifications are also encompassed within the scope of the present invention. As some examples, various aspects of embodiments described above can be incorporated into other embodiments described above, and various other modifications can be made as would be understood by those in the art based on this disclosure.

What is claimed is:

1. A method of pre-setting a self-adjusting clutch having a plurality of cam rings, an indicator wear tab on one of the cam rings and a release bearing having a position which is directly affected by a position of the indicator wear tab, comprising the steps of:

a) releasing the clutch pressure to allow the indicator wear tab to move;
   b) positioning an adjustable contact element against the indicator wear tab to limit the movement of the indicator wear tab so as to specifically locate the position of the wear tab and, hence, the position of the release bearing;
   c) reapplying the clutch pressure;
   d) measuring the position of the release bearing to ensure that the position of the release bearing is within a predetermined range, and wherein, if the measured position is outside of the predetermined range, repeating steps a) through d) until the measured position is within the predetermined range by readjusting the position of the adjustable contact element.

2. The method of claim 1, wherein said clutch is adapted to be assembled with an engine and a transmission, and further including carrying out said steps a) through d) prior to connecting said engine to said transmission.

3. The method of claim 1, wherein the release bearing is set within a tolerance of less than 0.06 inches.

4. The method of claim 1, wherein the release bearing is set within a tolerance of less than 0.04 inches.

5. The method of claim 1, wherein said step b) of positioning the adjustable contact element includes providing said adjustable contact element on an adjustment device, the adjustment device including means for attachment proximate to the clutch and a means for adjusting the position of the adjustable contact element.

6. The method of claim 5, wherein said adjustment device includes a frame having first and second members that position the frame proximate the clutch.

7. The method of claim 6, wherein said first connecting member includes an arm having a stop surface and said second connecting member includes a locating pin, and further including the steps of positioning said locating pin within a bore in a clutch cover of said clutch and moving said stop surface against a ridge of said clutch cover.

8. The method of claim 5, wherein said means for adjusting the position of the adjustable contact element includes a threaded shaft that is received within an internally threaded bore in a frame of the adjustment device.

9. The method of claim 8, wherein said threaded shaft includes a manually operated knob on one end of the shaft and said contact element on an opposite end of the shaft.

* * * * *